(12) United States Patent
Yamaguchi

(10) Patent No.: US 12,444,937 B2
(45) Date of Patent: Oct. 14, 2025

(54) BRANCHING DEVICE, OPTICAL SUBMARINE CABLE SYSTEM, AND POWER SUPPLY METHOD

(71) Applicant: NEC Corporation, Tokyo (JP)

(72) Inventor: Shohei Yamaguchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 291 days.

(21) Appl. No.: 18/222,265

(22) Filed: Jul. 14, 2023

(65) Prior Publication Data

US 2024/0097438 A1    Mar. 21, 2024

(30) Foreign Application Priority Data

Sep. 21, 2022   (JP) ................... 2022-149707

(51) Int. Cl.
*H02J 1/08* (2006.01)
*H04B 3/44* (2006.01)

(52) U.S. Cl.
CPC ............. *H02J 1/084* (2020.01); *H04B 3/44* (2013.01)

(58) Field of Classification Search
CPC .................... H02J 1/084; H04B 3/44
See application file for complete search history.

(56) References Cited

U.S. PATENT DOCUMENTS

| | | | | |
|---|---|---|---|---|
| 6,714,394 B1* | 3/2004 | Kumayasu | ........... | H04B 10/806 361/64 |
| 2002/0057477 A1* | 5/2002 | Rocca | ................ | H04J 14/0289 398/104 |
| 2017/0331516 A1* | 11/2017 | Yamaguchi | .............. | H04B 3/44 |
| 2020/0033542 A1* | 1/2020 | Garrett | ................ | G02B 6/4427 |

FOREIGN PATENT DOCUMENTS

JP    2020-515152 A    5/2020

* cited by examiner

*Primary Examiner* — Quan Zhen Wang
(74) *Attorney, Agent, or Firm* — Sughrue Mion, PLLC

(57) ABSTRACT

A branching device to be used for branching a power supply path connecting a first trunk station and a second trunk station to a branch station, the branching device including: a first power reception port being connected with a first power supply path connected to the first trunk station; a second power reception port being connected with a second power supply path connected to the second trunk station; a third power reception port being connected with a third power supply path connected to the branch station; and a power supply unit configured to supply, via the third power reception port, power to the third power supply path by power supply from at least either of the first power supply path and the second power supply path.

12 Claims, 11 Drawing Sheets

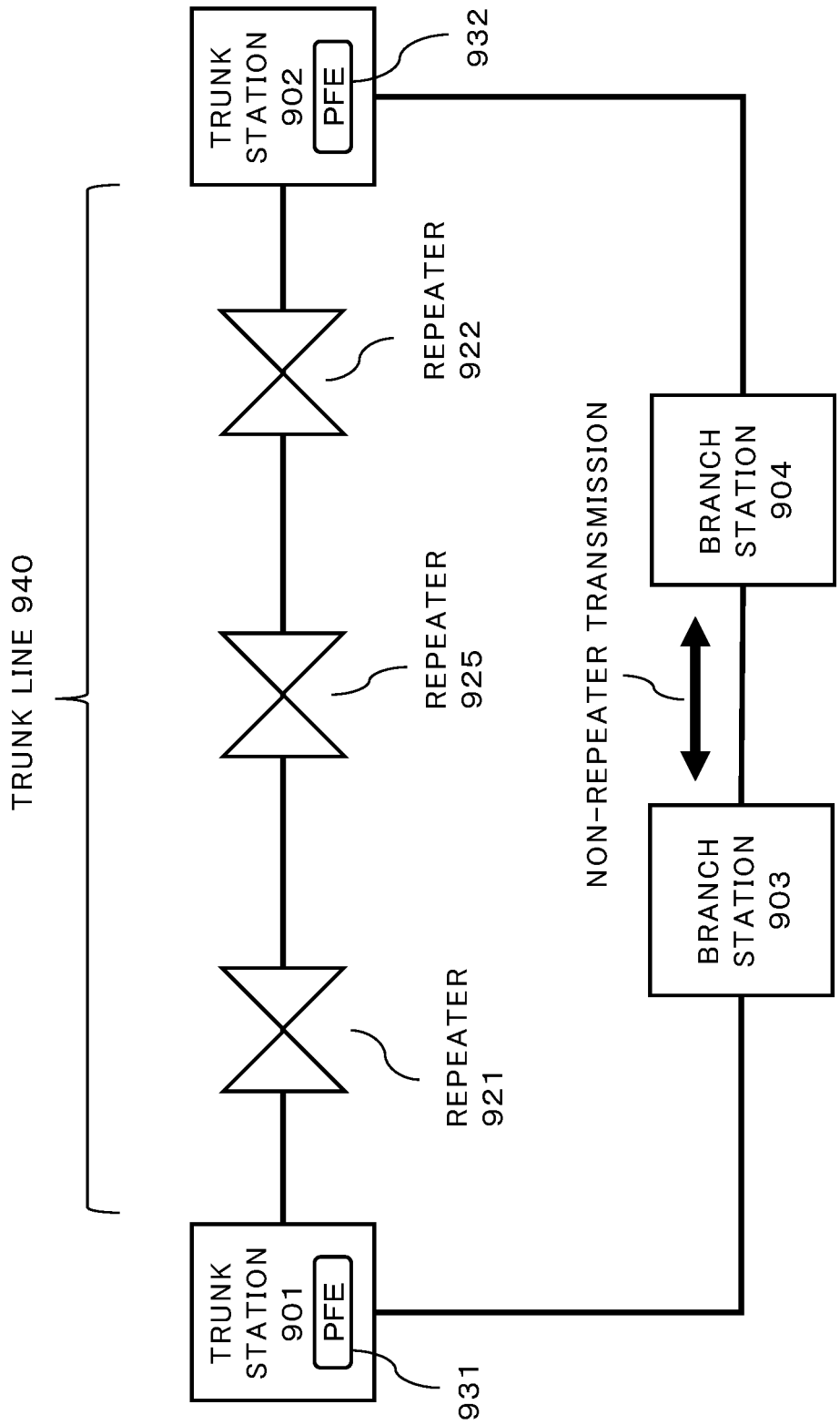

BRANCHING DEVICE, OPTICAL SUBMARINE CABLE SYSTEM, AND POWER SUPPLY METHOD

This application is based upon and claims the benefit of priority from Japanese patent application No. 2022-149707, filed on Sep. 21, 2022, the disclosure of which is incorporated herein in its entirety by reference.

TECHNICAL FIELD

The present disclosure relates to a branching device and the like to be used in an optical fiber transmission system.

BACKGROUND ART

FIG. 10 is a diagram illustrating a configuration example of a general optical submarine cable system 9. The optical submarine cable system 9 includes trunk stations 901 and 902, branch stations 903 and 904, branching devices 911 and 912, and repeaters 921 to 925. The trunk stations 901 and 902 and the branch stations 903 and 904 are installed on land. The branching devices 911 and 912 and the repeaters 921 to 925 are installed in the sea or on a sea bottom.

A line connecting the trunk station 901 and the trunk station 902 is referred to as a trunk line 940. On the trunk line 940, the repeaters 921, 922, and 925 that repeat an optical signal and the branching devices 911 and 912 are installed. The branching device 911 branches a branch line 941 from the trunk line 940. The branch line 941 reaches, via the repeater 923, the branch station 903 from the branching device 911. The branching device 912 branches a branch line 942 from the trunk line 940. The branch line 942 reaches, via the repeater 924, the branch station 904 from the branching device 912. The branching devices 911 and 912 enable the branch stations 903 and 904 to transmit/receive an optical signal to/from another branch station or a trunk station.

In order to supply power to the repeaters 921 to 925, the trunk stations 901 and 902 and the branch stations 903 and 904 include PFE 931 to 934. The PFE is an abbreviation of power feeding equipment (power supply device). The PFE 931 to 934 supply power to the optical submarine cable system 9, by using power received from a power network on land. The PFE 931 and PFE 932 are usually connected electrically and, for example, power based on constant current is supplied from the PFE 931 to the PFE 932. The repeaters 921, 922, and 925 and the branching devices 911 and 912 operate by using power acquired from a power supply path connecting the PFE 931 and the PFE 932.

The PFE 933 is installed in the branch station 903 and supplies power based on constant current to the branch line 941. A power supply path of the branch line 941 connecting the branch station 903 and the branching device 911 is not electrically connected to a power supply path of the trunk line 940. Power supply current from the PFE 933 is connected to a sea earth (SE) in the branching device 911. The repeater 923 operates by using power from a power supply path connecting the PFE 933 and the branching device 911. The above description is similar to the PFE 934, and the PFE 934 is installed in the branch station 904. The repeater 924 operates by using power from a power supply path connecting the PFE 934 and the branching device 912.

Relating to the present disclosure, PTL 1 describes a configuration for supplying, based on power supply from PFE installed in a branch path, power to a device installed in a trunk path.

[PTL 1] Japanese Unexamined Patent Application Publication (Translation of PCT Application) No. 2020-515152

SUMMARY

In the optical submarine cable system 9 illustrated in FIG. 10, in order to supply power to the repeaters 923 and 924 installed on the branch lines 941 and 942, it is necessary to install the PFE 933 and PFE 934 in the branch stations 903 and 904 each. Even when PFE is installed on the branch lines 941 and 942, a power source device for supplying power to the PFE is required for the branch stations 903 and 904.

However, in an optical submarine cable system being laid, for example, by connecting islands having a small number of flatlands, a space for installing a power source device such as the PFE 933 and PFE 934 in a station building for the branch stations 903 and 904 may not always be ensured. In such a case, it is difficult to supply power from the branch stations 903 and 904 to the repeaters 923 and 924, and therefore it is necessary for the branch lines 941 and 942 to perform non-repeater transmission without a repeater. As a result, in islands located away from the trunk line 940, there is a problem that it is difficult to lay a branch line by using a branching device.

FIG. 11 is a diagram illustrating a configuration example of another general optical submarine cable system 9A. In FIG. 11, a station building for branch stations 903 and 904 is narrow, and therefore it is difficult to install PFE for the branch stations 903 and 904. A trunk line 940 is distant from the branch stations 903 and 904, and therefore, differently from FIG. 10, it is difficult to branch the trunk line 940 and install branch lines 941 and 942.

Therefore, in FIG. 11, the branch stations 903 and 904 are connected to trunk stations 901 and 902, based on a path not going through the trunk line 940. However, in the configuration of FIG. 11, in order to enable the branch station 903 and the branch station 904 to communicate with each other, it is necessary for at least a distance between the branch station 903 and the branch station 904 to fall within a range of a distance enabling non-repeater transmission. In other words, there is a problem that the optical submarine cable system 9A is largely limited to disposition of a branch station.

An exemplary object of the invention is to provide a technique for enabling power supply to a branch line without installation of a power supply device in a branch station.

A branching device according to an exemplary example embodiment of the present disclosure is a branching device being used for branching a power supply path connecting a first trunk station and a second trunk station to a branch station, and includes:
  a first power reception port being connected with a first power supply path connected to the first trunk station;
  a second power reception port being connected with a second power supply path connected to the second trunk station;
  a third power reception port being connected with a third power supply path connected to the branch station; and
  a power supply unit configured to supply, via the third power reception port, power to the third power supply path by power supply from at least either of the first power supply path and the second power supply path.

A power supply method according to an exemplary example embodiment of the present disclosure is a power supply method applied to a branching device for branching a power supply path connecting a first trunk station and a second trunk station to a branch station, and includes a procedure of:

receiving supply of power from at least either of a first power supply path being connected to the first trunk station and a second power supply path being connected to the second trunk station; and supplying, to a third power supply path connected to the branch station, the power being supplied from at least either of the first power supply path and the second power supply path.

BRIEF DESCRIPTION OF THE DRAWINGS

Exemplary features and advantages of the present disclosure will become apparent from the following detailed description when taken with the accompanying drawings in which:

FIG. 11 is an exemplary diagram illustrating a configuration of another general optical submarine cable system.

EXAMPLE EMBODIMENT

Figure 1:
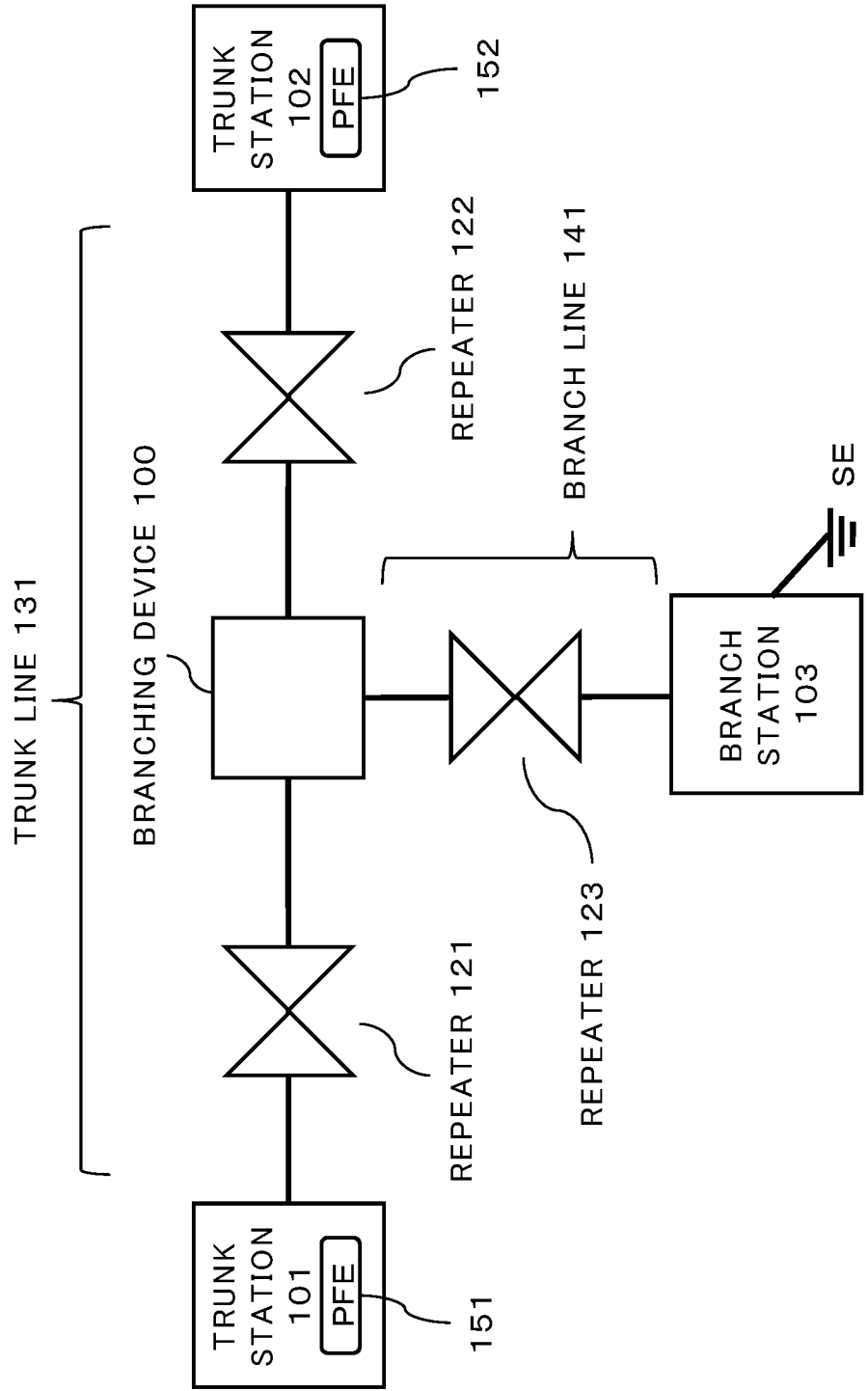
FIG. 1 is an exemplary diagram illustrating a configuration of an optical submarine cable system.

Example embodiments according to the present disclosure are described below with reference to the drawings. An arrow illustrated in a figure exemplarily indicates a direction of a signal or current and is not intended for the limitation. According to the example embodiments and in the drawings, a previously-described element is assigned with the same reference sign, and overlapping description may be omitted. In description and drawings of example embodiments, description and explanation of a publicly-known configuration such as a land station, a repeater, and a branching device for transmitting an optical signal may be omitted, as appropriate.

First Example Embodiment

FIG. 1 is a diagram illustrating a configuration example of an optical submarine cable system 1 to which a branching device 10 according to the present disclosure is applied. The optical submarine cable system 1 includes a trunk station 101, a trunk station 102, a branch station 103, a branching device 100, and repeaters 121 to 123. The branching device 100 and the repeaters 121 to 123 are generally installed on a sea bottom. The trunk stations 101 and 102 and the branch station 103 are installed on land. The trunk stations 101 and 102 and the branch station 103 may be collectively referred to as a land station. The branching device 100 and the repeaters 121 to 123 may be collectively referred to as submarine equipment. The trunk station 101 corresponds to a first trunk station, and the trunk station 102 corresponds to a second trunk station.

Each land station includes an optical transponder. The optical transponder transmits/receives a WDM signal modulated by user data to/from an opposite land station, and thereby transmits the user data. The WDM signal indicates a wavelength division multiplexed optical signal. The WDM signal is a signal in which a plurality of optical signals different in wavelength from one another are wavelength-multiplexed.

The trunk stations 101 and 102, the branch station 103, the repeaters 121 to 123, and the branching device 100 are connected by a general submarine cable. The submarine cable includes an optical fiber for transmitting a WDM signal and a conductor for supplying power. The WDM signal may include, in addition to user date, a signal for monitoring and controlling the optical submarine cable system 1. The repeaters 121 to 123 each include a function of amplifying an attenuated WDM signal. Power for operating each repeater is supplied from a power supply path of a submarine cable connected to each of the repeaters. According to the present example embodiment, the repeater 123 operates, as described later, by power supply from the branching device 100. The branch station 103 is grounded by connecting a power supply path being connected to the branching device 100 to a sea earth (SE).

A line connecting the trunk station 101 and the trunk station 102 is referred to as a trunk line 131. On the trunk line 131, the branching device 100 and the repeaters 121 and 122 are installed. The trunk line 131 includes an optical line and a power supply path between the trunk station 101 and the trunk station 102. A line connecting the branching device 100 and the branch station 103 is referred to as a branch line 141. The repeater 123 is installed on the branch line 141. The branch line 141 includes an optical line and a power supply path between the branching device 100 and the branch station 103.

The branching device 100 is used for branching, to the branch line 141, a part or whole of a WDM signal transmitted through the trunk line 131. The branching device 100 is connected with a branch line, and thereby via the branching device 100, the trunk station 101 and the trunk station 102 are communicably connected to the branch station 103 by a WDM signal.

The trunk stations 101 and 102 and the branch station 103 mutually transmit/receive a WDM signal. The branching device 100 switches, per wavelength, an optical path of an optical signal included in a WDM signal in such a way that an optical signal of a predetermined wavelength in a WDM signal transmitted through the trunk line 131 is communicable with the branch station 103. In order to branch an optical signal in this manner, an optical add/drop multiplexer (OADM) is usable. In other words, the branching device 100 may include an OADM. A configuration of an OADM for branching an optical signal is publicly known and therefore, is not directly related to a configuration of a power supply path according to each example embodiment. Therefore, according to each example embodiment, only a power supply path is described, unless necessary.

Figure 2:
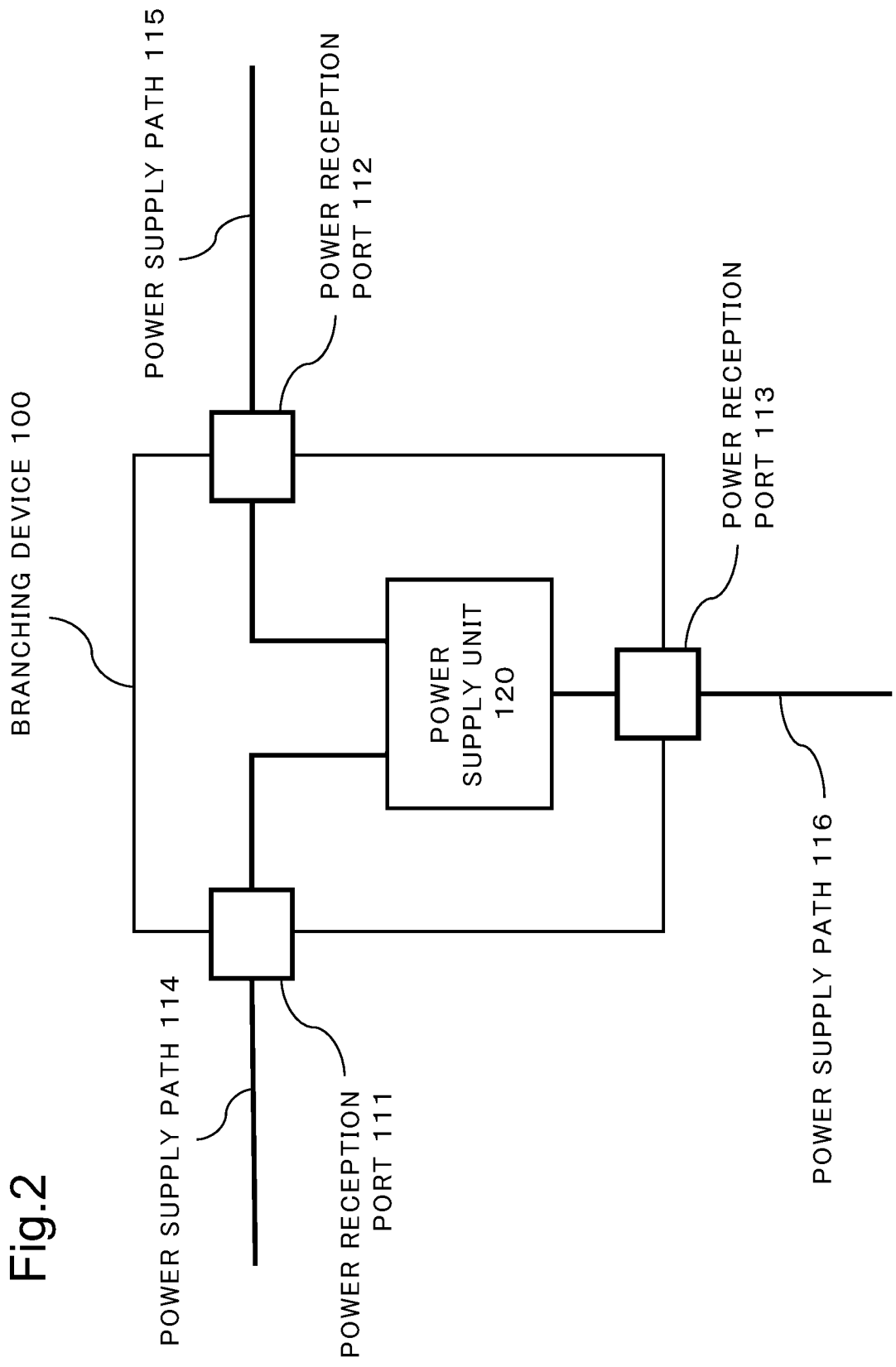
FIG. 2 is an exemplary diagram illustrating a configuration of a power supply system of a branching device.

FIG. 2 is a diagram illustrating a configuration example of a power supply system of the branching device 100. The branching device 100 includes power reception ports 111 to 113 and a power supply unit 120. The power reception ports 111, 112, and 113 each are a conductor connected to a power supply line inside the branching device 100 and are connected, based on brazing, crimping or the like, to the power supply paths 114, 115, and 116, respectively. In other words, the power reception port 111 is connected with a power supply path 114 being connected to the trunk station 101. The power reception port 112 is connected with a power supply path 115 being connected to the trunk station 102. The power reception port 113 is connected with the power supply path 116 being connected to the branch station 103. The power supply paths 114 and 115 form a part of the trunk line 131. The power supply paths 114 and 115 configures a power supply path for supplying power to the repeaters 121 and 122 and the branching device 100. The power supply paths 114 and 115 may supply power to submarine equipment other than the repeaters 121 and 122. The power supply path 116 forms a part of the branch line 141. The power supply path 116 configures a power supply path for supplying power to the repeater 123. The power supply path 116 may supply power to submarine equipment other than the repeater 123.

The power supply unit 120 generates, by power supply from the power supply path 114 and the power supply path 115, power for supplying power to the power supply path 116. According to the present example embodiment, the branch station 103 may include a function of terminating the power supply path 116 (e.g., a function of connecting the power supply path 116 to a sea earth (SE)). The branch station 103 does not need to include PFE (i.e., a power supply function) in order to supply power to the repeater 123 and the like on the branch line 141.

The power supply unit 120 supplies power to an electric circuit inside the branching device 100, regardless of whether the branching device 100 and the power supply path 116 are connected. The power supply unit 120 connects the power supply path 114 and the power supply path 115 inside the branching device 100 and maintains power supply between the trunk station 101 and the trunk station 102. However, the power supply unit 120 may stop, when the branching device 100 and the power supply path 116 are not connected, generating power supplied to the power supply path 116. The power supply unit 120 may start or stop, based on an instruction from the trunk station 101 or the trunk station 102, supplying power to the power supply path 116. The power supply unit 120 may control power supply to the power supply path 116, for example, by using a start signal received from at least either of the trunk station 101 and the trunk station 102. The start signal may be notified to the branching device 100 by using a monitoring-control optical signal. The monitoring-control optical signal may be included in a WDM signal transmitted by the trunk station 101 or the trunk station 102. The branching device 100 receives a monitoring-control optical signal and starts or stops the power supply unit 120 according to a start signal extracted from the optical signal. Based on such an operation, even when the branch station 103 is not installed, power supply to the power supply paths 114 and 115 is maintained, and in the power supply unit 120, power consumption of an electric circuit for supplying power to the power supply path 116 is reduced.

Moreover, the power supply unit 120 may detect that the power supply path 116 is connected to the power reception port 113 and start or stop the power supply unit 120 according to the result. The branching device 100 may, for example, monitor a potential of the power reception port 113 and detect a change of the potential, based on connection of the power supply path 116 to the power reception port 113. A threshold for determining presence/absence of such a change in potential may be previously measured based on an experiment or the like and stored in the branching device 100. When a change in potential indicates that the power supply path 116 is connected to the power reception port 113, the branching device 100 starts the power supply unit 120, and when the connection is lost, the branching device 100 stops the power supply unit 120. In other words, the power supply unit 120 may supply power to the power supply path 116 according to connection of the power supply path 116 to the power reception port 113. The power supply unit 120 including such a function is one embodiment of the power supply unit.

As described above, the branching device 100 enables power supply to the branch line 141 and the repeater 123 without installation of PFE in the branch station 103. The reason is that the branching device 100 includes the power supply unit 120, and the power supply unit 120 generates, by power supply from the power supply paths 114 and 115, power for supplying power to a repeater and the like installed in the power supply path 116. As a result, the branching device 100 enables power supply to equipment installed between the branch station 103 and the branching device 100, even when it is difficult to install a power source device such as PFE in the branch station 103.

When, for example, the branching device 100 according to the present example embodiment is used, it is unnecessary to install PFE in the branch station 103 installed in an island or the like. Therefore, the branch station 103 is installed in a narrow ground where it is difficult to install the branch station 103 so far, and thereby the branch line 141 including the repeater 123 can be laid.

The repeater 123 can be installed on the branch line 141, and therefore a line length between the branching device 100 and the branch station 103 can be elongated. When it is difficult to supply power to the branch line 141, a length of the branch line 141 is limited to a distance where non-repeater transmission is possible or less. However, the branching device 100 described according to the present example embodiment can supply power to the branch line 141 from the branching device 100, and therefore it is unnecessary to design the branch line 141 on a premise of non-repeater transmission. As a result, when the optical submarine cable system 1 is being designed, a degree of freedom when the branch station 103 and submarine equipment connected to the station are disposed is increased, and thereby a more preferable network can be constructed.

Modified Example of First Example Embodiment

Figure 3:
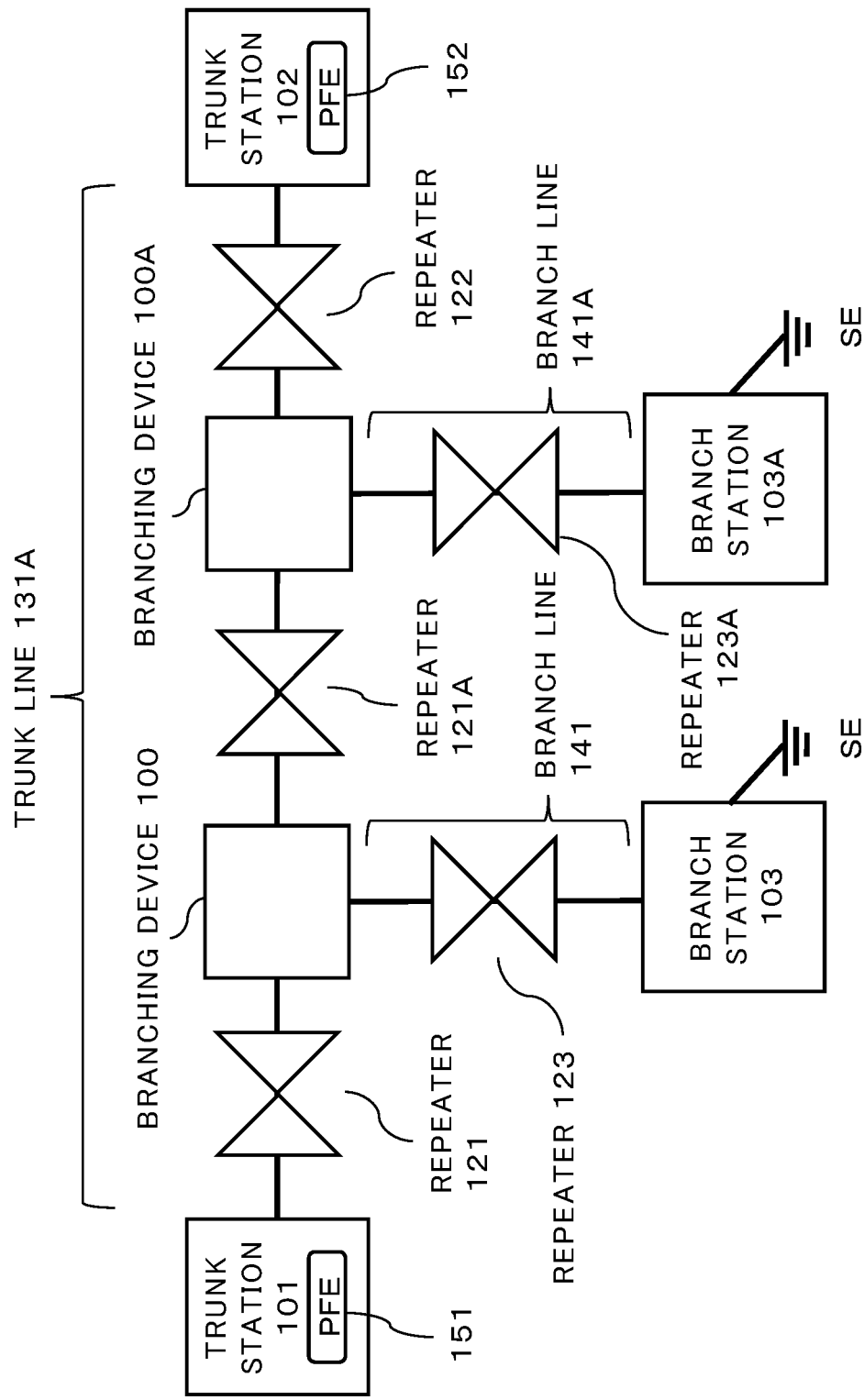
FIG. 3 is an exemplary diagram illustrating a configuration of an optical submarine cable system.

FIG. 3 is a diagram illustrating a configuration example of an optical submarine cable system 1A. The optical submarine cable system 1A includes, in addition to the configuration of the optical submarine cable system 1, a branching device 100A, a branch station 103A, and repeaters 121A and 123A. A function of the branching device 100A is similar to the branching device 100.

The branching device 100A is installed between the repeater 121A and the repeater 122. The repeater 121A is installed between the branching device 100 and the branching device 100A. The branching device 100A is used for branching an optical signal transmitted through a trunk line 131A to a direction of the branch station 103A. A branch line 141A includes a power supply path for supplying power from the branching device 100A to the repeater 123A. Power supply paths of the branch lines 141 and 141A each are connected to a sea earth in the branch stations 103 and 103A, respectively.

In the optical submarine cable system 1A, the branching device 100A enables power supply to submarine equipment such as a repeater connected to a power supply path of the branch line 141A without installation of PFE in the branch station 103A. The reason is that the branching device 100A can supply, by power supply from the trunk line 131A, power to the branch line 141A. Thereby, even when it is difficult to install PFE in the branch station 103A, power can be supplied to equipment (e.g., the repeater 123A) installed between the branch station 103A and the branching device 100A. As described in FIGS. 1 and 2, the same applies to power supply from the branching device 100 to the branch line 141.

In FIG. 3, between the trunk station 101 and the trunk station 102, a branching device similar to the branching devices 100 and 100A may be further installed. Even in this case, any branching device can supply power to a branch line between branch stations including no PFE. In other words, the configurations of the optical submarine cable systems 1 and 1A described in FIGS. 1 and 4 exhibit an advantageous effect in that even when the number of branch stations is further increased, power can be supplied to a branch line between branch stations including no PFE.

Second Example Embodiment

Figure 4:
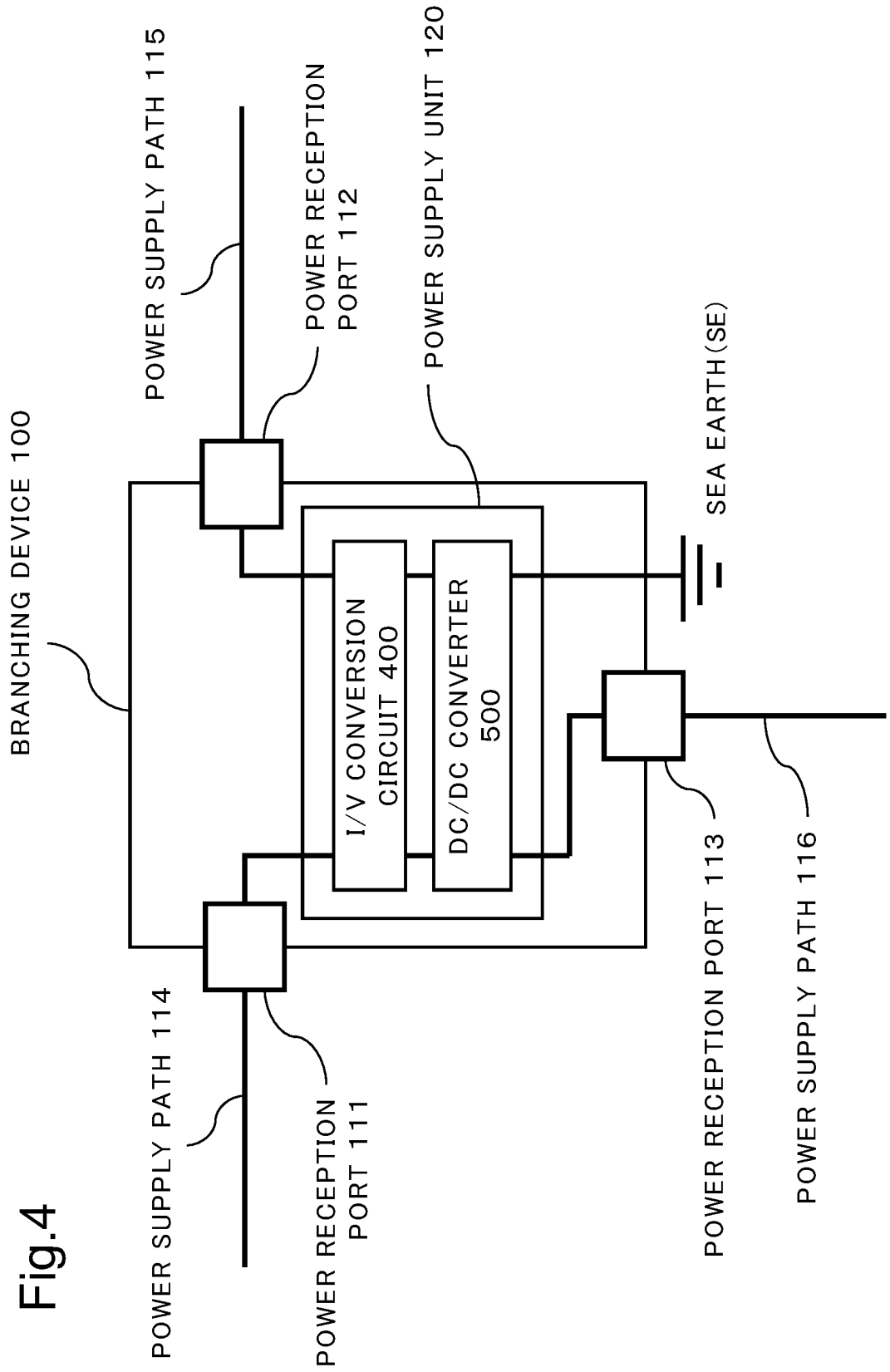
FIG. 4 is an exemplary diagram illustrating a detailed configuration of a branching device.

FIG. 4 is a diagram illustrating a detailed configuration example of the branching device 100 described according to the first example embodiment. In general, in an optical submarine cable system, power supply from a land station is performed based on constant current. In other words, equipment installed on a trunk line 131 between a trunk station 101 and a trunk station 102 operates by using power, which is supplied based on constant current, acquired from power supply paths 114 and 115. According to the present example embodiment, a configuration example in which by using a DC/DC converter, power supplied to a branch line 141 is acquired from power of a power supply path of the trunk line 131 is described. The DC/DC converter is an electric component including a circuit for converting voltage or current, based on direct current.

Figure 5:
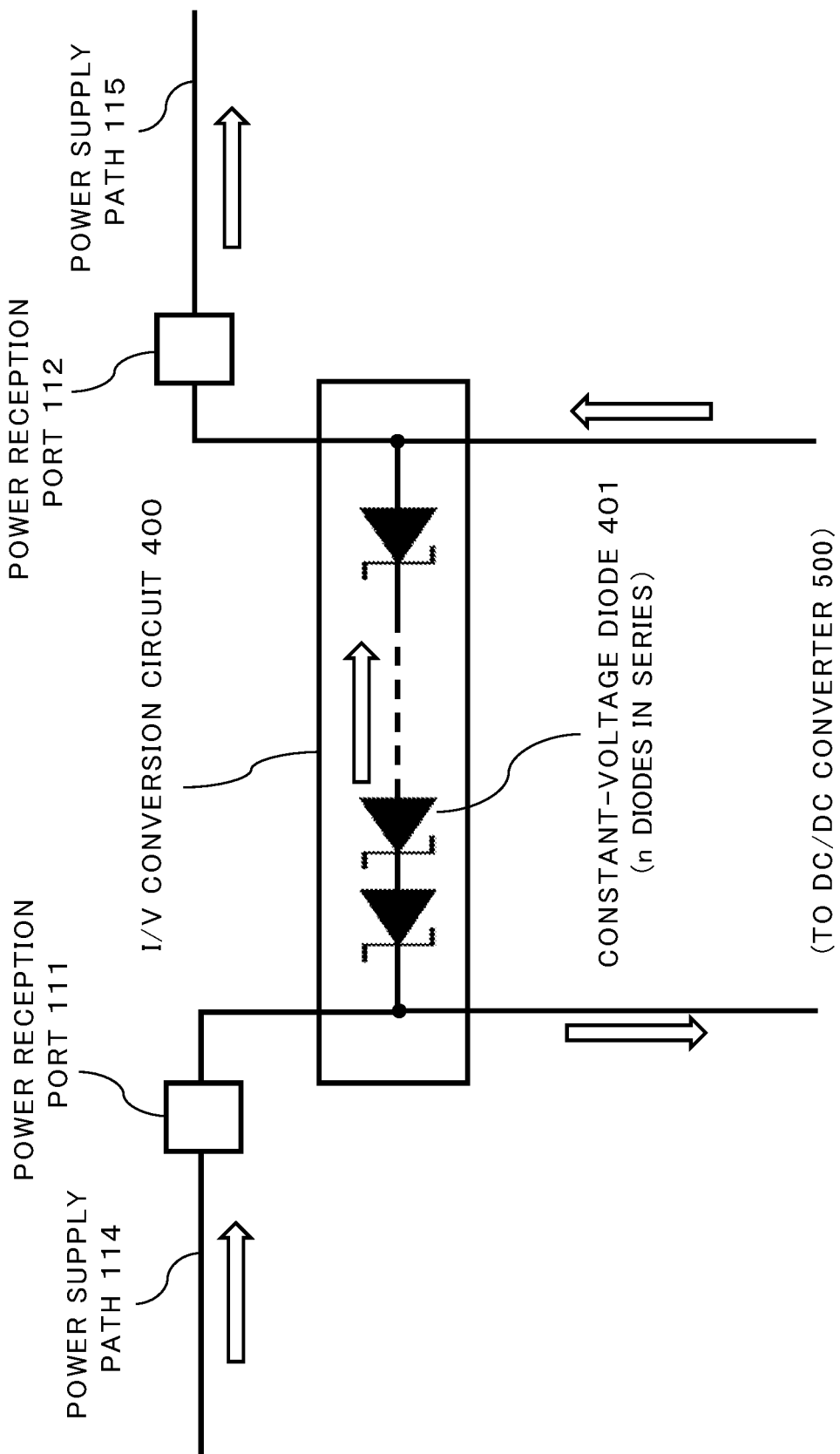
FIG. 5 is an exemplary diagram illustrating a configuration of an I/V conversion circuit.

A power supply unit 120 included in the branching device 100 includes an I/V conversion circuit 400 and a DC/DC converter 500. The I/V conversion circuit 400 is a current/voltage conversion circuit. The I/V conversion circuit 400 is installed between the power supply path 114 and the power supply path 115 and acquires a predetermined voltage from a constant-current power supply path. The acquired voltage is supplied to input of the DC/DC converter 500. The DC/DC converter 500 converts the predetermined voltage input from the I/V conversion circuit 400 into direct-current voltage or direct current suitable for power supply to a power supply path 116. One direct-current voltage (e.g., a high potential side) output from the DC/DC converter 500 is connected to the third power supply path 116. The other output (e.g., a low potential side) of the DC/DC converter 500 is grounded in the branching device 100. FIG. 5 illustrates an example in which the other output of the DC/DC converter 500 is grounded by a sea earth. In other drawings, illustration for wiring of a grounded side of output of the DC/DC converter 500 is omitted.

A repeater installed in the power supply path 116 operates by using current output from the DC/DC converter 500. The power supply path 116 is grounded (e.g., connected to a sea earth) in the branch station 103. Thereby, current output from the DC/DC converter 500 configures a closed circuit by grounding of the power supply path 116 and the branch station 103 and grounding of the branching device 100.

Figure 6:
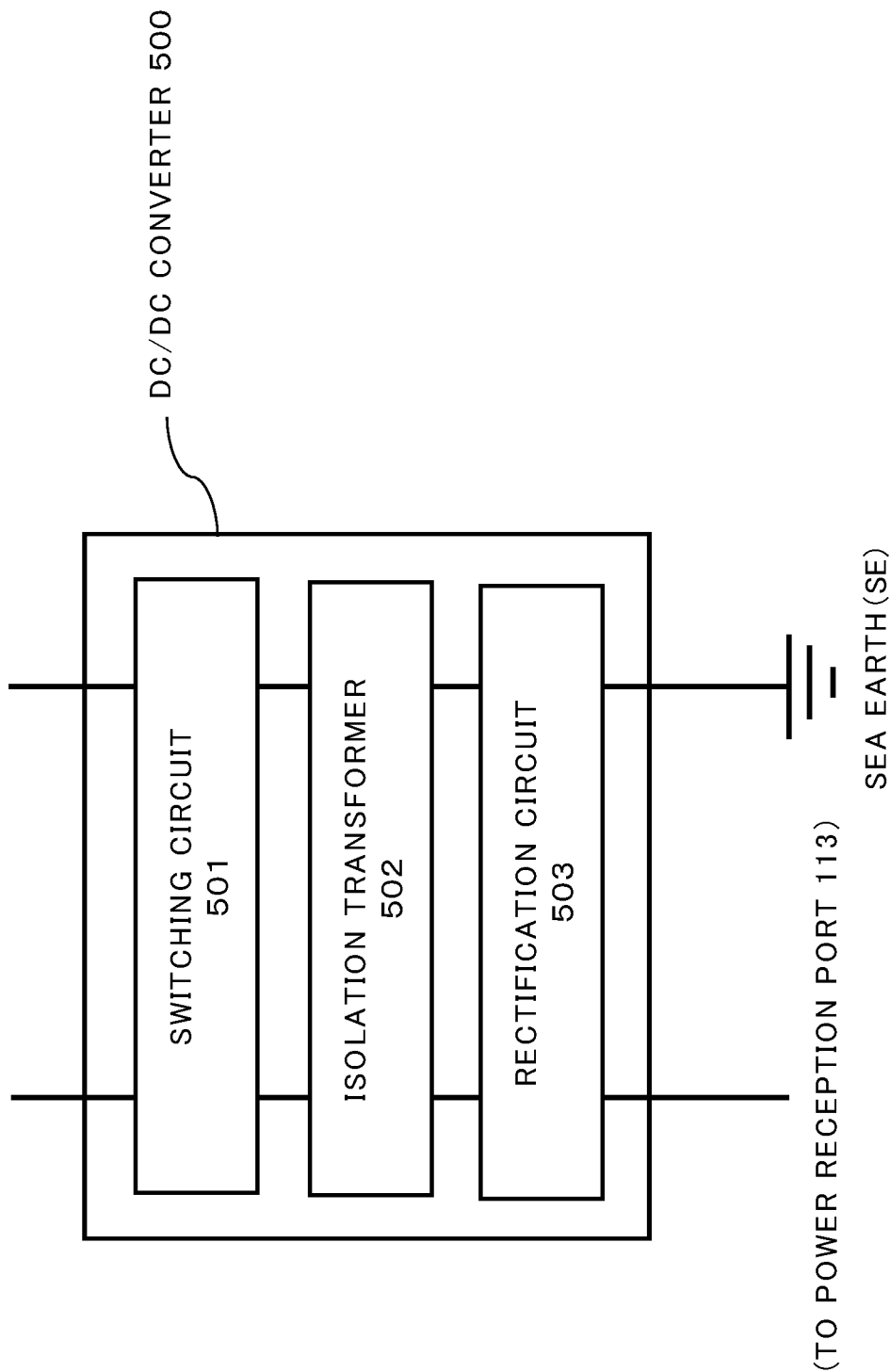
FIG. 6 is an exemplary diagram illustrating a configuration of a DC/DC converter.

FIG. 5 is a diagram illustrating a configuration example of the I/V conversion circuit 400. In the I/V conversion circuit 400, one or a plurality of constant-voltage diodes 401 are connected in a direction opposite to a potential difference between the power supply path 114 and the power supply path 115. The constant-voltage diode 401 is caused to be conductive by applying a reverse voltage of a Zener voltage or more. FIG. 6 illustrates an example in which a voltage of a first power reception port 111 is higher than a voltage of a second power reception port 112. In this case, power supply current flows in a direction indicated by a white arrow, and voltages of both ends of one constant-voltage diode 401 are substantially a constant voltage (Zener voltage). In other words, when a Zener voltage of one constant-voltage diode 401 is designated as Vz, voltages of both ends of the I/V conversion circuit 400 is n×Vz. Herein, n is a natural number being the number of constant-voltage diodes 401 connected in series and having the same Zener voltage. In this manner, the I/V conversion circuit 400 generates direct-current voltage from power supply current. The generated voltage is applied to input of the DC/DC converter 500. The number of constant-voltage diodes 401 connected in series is determined according to each Zener voltage and an input voltage of the DC/DC converter 500 necessary for the DC/DC converter 500 to generate desired power. A direction of power supply current in FIG. 5 is merely an example, and is not limited thereto. The power supply current may flow in a direction of the power supply path 114 from the power supply path 115. In this case, polarity of a constant-voltage diode of the I/V conversion circuit 400 is also reverse to FIG. 5.

FIG. 6 is a diagram illustrating a configuration example of the DC/DC converter 500. The DC/DC converter 500 includes a switching circuit 501, an isolation transformer 502, and a rectification circuit 503. The switching circuit 501 converts, via switching, voltage (n×Vz) generated in the I/V conversion circuit 400 into alternating-current voltage and inputs the converted alternating-current voltage to a primary side of the isolation transformer 502. The isolation transformer 502 transforms the alternating-current voltage input to the primary side and outputs the transformed alternating-current voltage to a secondary side. The rectification circuit 503 converts the alternating-current voltage present on the secondary side of the isolation transformer 502 into direct-current voltage and outputs the direct-current voltage to an outside of the DC/DC converter 500. The rectification circuit 503 may include a smoothing circuit for smoothing direct-current voltage and a control circuit for controlling output of the DC/DC converter 500. The control circuit controls a rectification circuit, for example, in such a way that output of the DC/DC converter 500 is constant voltage or constant current. One potential of output of the DC/DC converter 500 is connected to a sea earth and output of the other potential is supplied to the third power supply path 116 via a third power reception port 113. A repeater 123 that receives power supply from the power supply path 116 operates by acquiring power from the power supply path 116, based on a circuit similar to the I/V conversion circuit 400.

The configurations of the I/V conversion circuit 400 and the DC/DC converter 500 having described according to the present example embodiment each are merely an example.

The power supply unit 120 may be configured by using a publicly-known current/voltage conversion circuit or DC/DC converter.

Also, the branching device 100 being described according to the second example embodiment enables power supply to the power supply path 116 of the branch line 141, by using power supplied by the power supply unit 120, from the power supply paths 114 and 115 of the trunk line 131 to the branching device 100. As a result, when it is difficult to install PFE in the branch station 103, power can be supplied to equipment such as the repeater 123 installed between the branch station 103 and the branching device 100, without installation of PFE in the branch station 103 and the branch line 141. For the DC/DC converter 500, a generally-known component is usable. Therefore, the branching device 100 according to the present example embodiment can reduce a cost for supplying power to the branch line 141, compared with when dedicated PFE is installed in the branch station 103.

Third Example Embodiment

Figure 7:
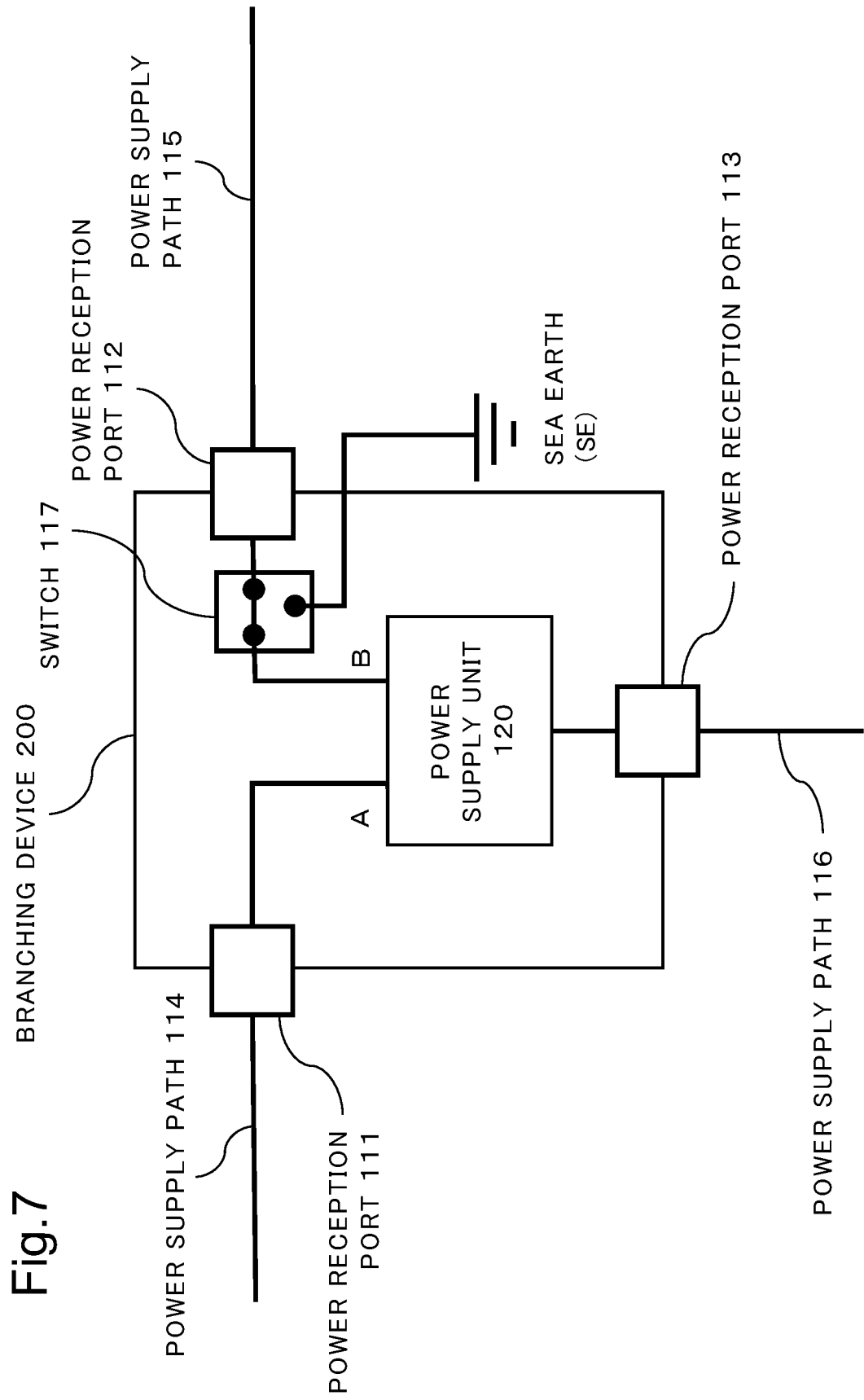
FIG. 7 is an exemplary diagram illustrating a configuration of a branching device.
Figure 8:
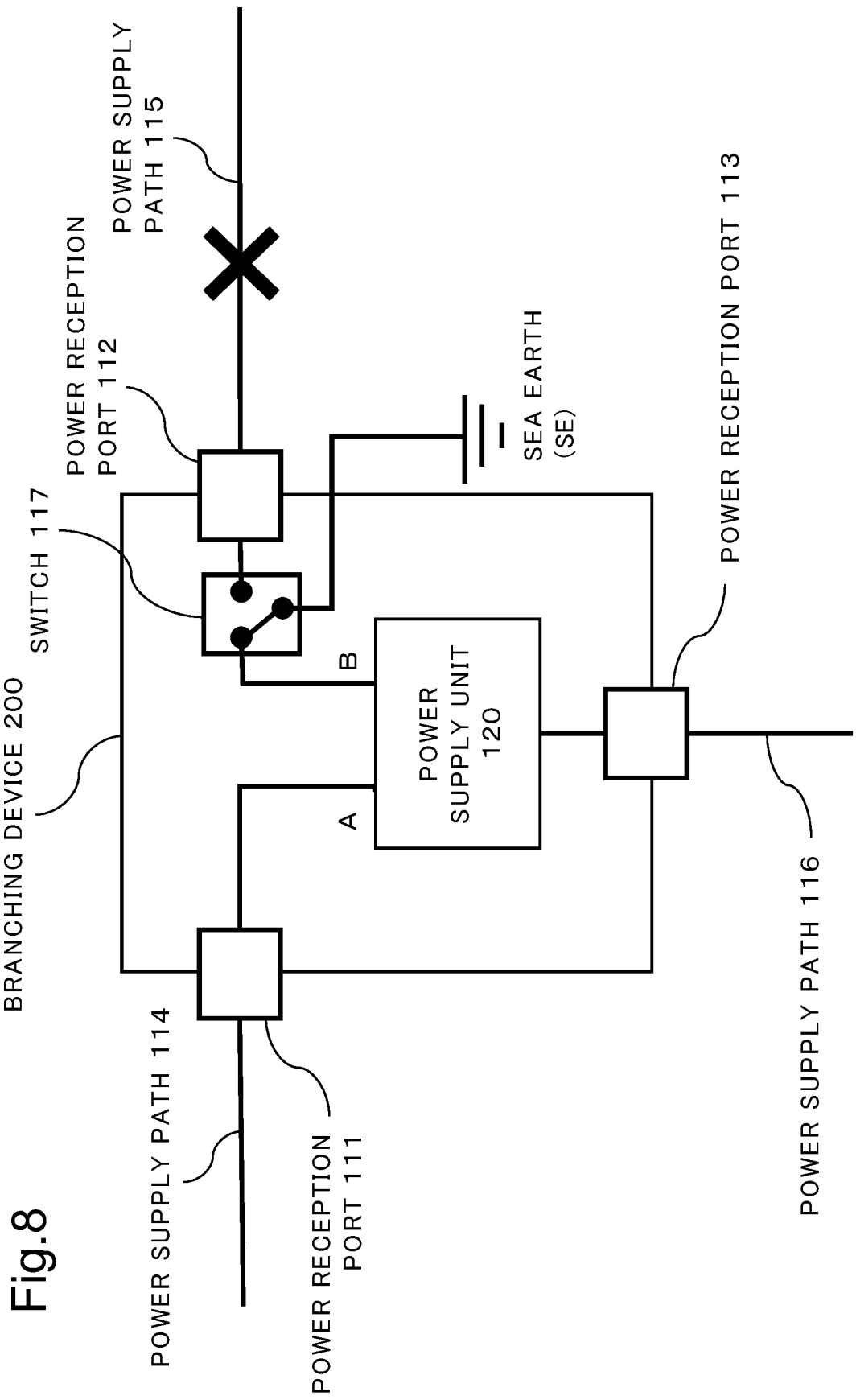
FIG. 8 is an exemplary diagram illustrating a configuration of a branching device.

FIGS. 7 and 8 each are a diagram illustrating a configuration example of a branching device 200 according to a third example embodiment of the present disclosure. The branching device 200 is different from the branching device 100 according to the first and second example embodiments in that a first switch 117 is provided between a power supply unit 120 and a power reception port 112. The first switch 117 is a 1×2 electric switch and connects a terminal B of the power supply unit 120 to either the power reception port 112 or a sea earth. The terminal B is a terminal connectable to a power supply path 115 via the first switch 117 and the power reception port 112. A terminal A is a terminal connectable to a power supply path 114 via the first switch 117 and a power reception port 111. The terminal A and the terminal B each are an interface of the power supply unit 120, being connected to the I/V conversion circuit 400 illustrated in FIG. 4.

FIG. 7 illustrates a case where the first switch 117 is switched in such a way as to connect the terminal B of the power supply unit 120 and the power reception port 112. When power supply based on the power supply paths 114 and 115 is normally performed, power is supplied to the branching device 200 in this state. However, when a failure occurs in the power supply path 115, power supply current does not normally flow from the power reception port 112 to a trunk station 102. In particular, when the power supply path 115 is broken, constant current cannot be supplied to the branching device 200 by the power supply paths 114 and 115.

FIG. 8 illustrates a case where the first switch 117 is switched in such a way as to connect the terminal B of the power supply unit 120 and a sea earth. In FIG. 8, a failure (mark x) occurs in the power supply path 115, and therefore power is supplied only by the power supply path 114 and power is not supplied from the power supply path 115. When, for example, in FIG. 7, breaking occurs in the power supply path 115, in a trunk line 131, constant current cannot be supplied to the branching device 200 by using the power supply path 115. However, in FIG. 8, the first switch 117 is switched in such a way that the terminal B of the power supply unit 120 is connected to the sea earth. A connection destination of the terminal B is switched to the sea earth, and thereby the power supply path 114 is grounded in the sea earth via the power supply unit 120. As a result, the power supply path 114 can continuously supply power based on constant current to the branching device 200 even after a failure of the power supply path 115 occurs. Therefore, even when a failure occurs in the power supply path 115, the power supply unit 120 can maintain power supply to a power supply path 116, based on power supply only from the power supply path 114, by switching the first switch 117. The branching device 200 may switch, based on an instruction from a land station, the first switch 117 as in FIG. 8.

Modified Example of Third Example Embodiment

Figure 9:
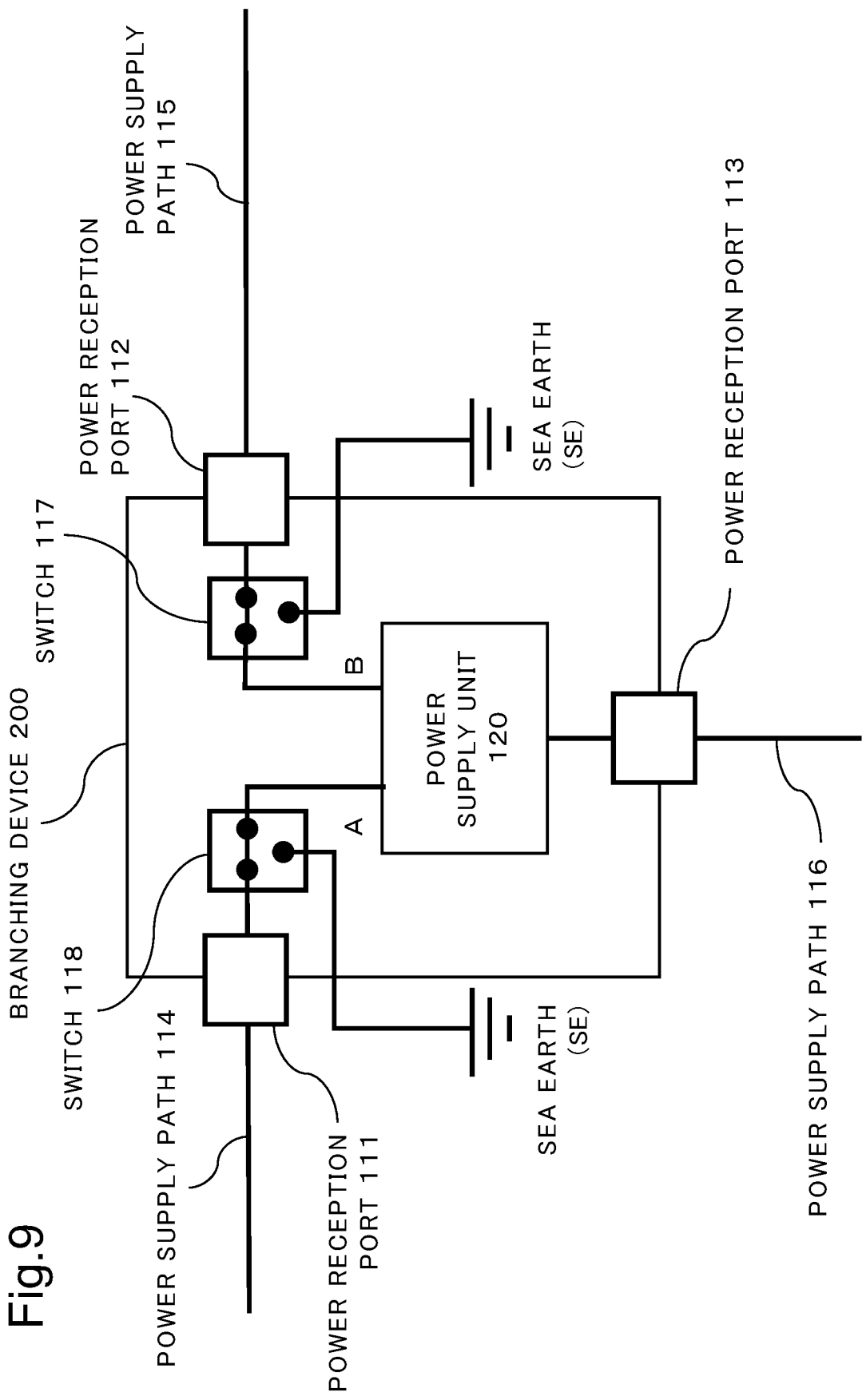
FIG. 9 is an exemplary diagram illustrating an example in which the branching device further includes a second switch.
Figure 10:
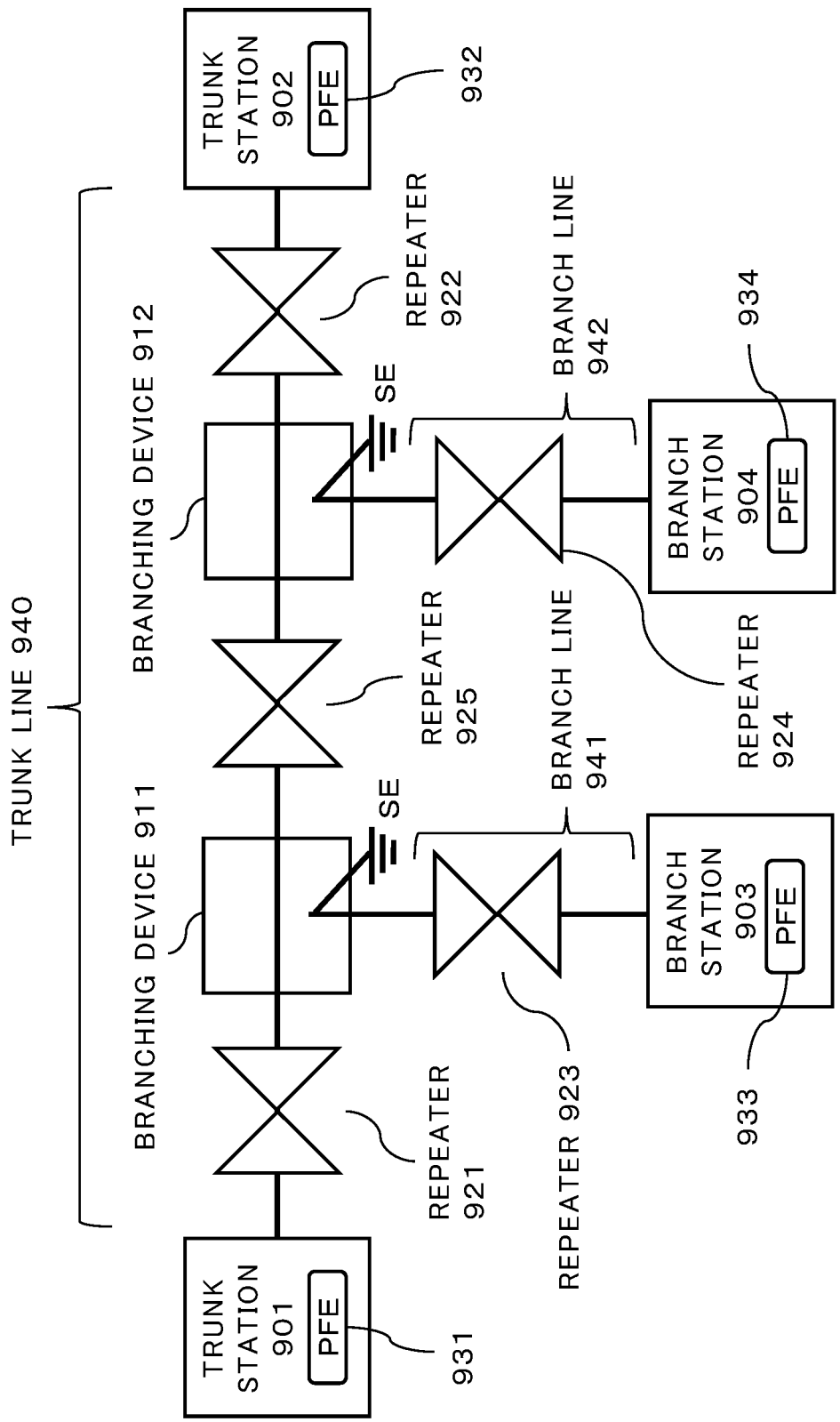
FIG. 10 is an exemplary diagram illustrating a configuration of a general optical submarine cable system.

FIG. 9 is a diagram illustrating an example in which the branching device 200 further includes a second switch 118. In FIGS. 7 and 8, an example in which the first switch 117 is provided between the terminal B of the power supply unit 120 and the power reception port 112 is described. The branching device 200 in FIG. 9 further includes, between the terminal A of the power supply unit 120 and the power reception port 111, the second switch 118 being different from the first switch 117. When the power supply path 114 is normal, the second switch 118 connects the terminal B of the power supply unit 120 and the power reception port 111. When a failure occurs in the power supply path 114, the second switch 118 connects the terminal A of the power supply unit 120 and a sea earth. A connection destination of the terminal A is switched to the sea earth, and thereby the power supply path 115 is grounded in the sea earth via the power supply unit 120. Therefore, the power supply unit 120 switches the second switch 118 also when a failure occurs in the power supply path 114 and thereby, can maintain power supply to the power supply path 116, based on power supply only from the power supply path 115. The branching device 200 may switch the first switch 117 and the second switch 118, based on an instruction from a land station.

The configuration of each of FIGS. 7 to 9 described above indicates an example in which the power supply unit 120 can supply power to the power supply path 116 via the power reception port 113, even based on either of the power supply path 114 and the power supply path 115.

(Another Expression of Branching Devices 100 and 200)

The configurations of the branching devices 100 and 200 described according to the first to third example embodiments can be also described as follows, by citing reference signs in figures in parentheses. That is, a branching device (100, 200) is a branching device used for branching a power supply path (114, 115) connecting a first trunk station (101) and a second trunk station (102) to a branch station (103). A first power reception port (111) is connected with a first power supply path (114) being connected to the first trunk station (101). A second power reception port (112) is connected with a second power supply path (115) being connected to the second trunk station (102). A third power reception port (113) is connected with a third power supply path (116) connected to the branch station (103). A power supply unit (120) supplies, via the third power reception port (113), power to a third power supply path (116) by power supply from at least either the first power supply path (114) or the second power supply path (115).

A branching device including such a configuration enables power supply to a branch line without installation of a power supply device in a branch station. The reason is that the power supply unit includes a function of supplying, via the third power reception port, power to the third power supply path, by power supply from at least either the first power supply path or the second power supply path.

While the disclosure has been particularly shown and described with reference to example embodiments thereof, the disclosure is not limited to these embodiments. It will be understood by those of ordinary skill in the art that various changes in form and details may be made therein without departing from the spirit and scope of the present disclosure as defined by the claims.

For example, the branching device according to example embodiments is applicable to not only an optical submarine cable system but also an optical fiber transmission system on land. Each example embodiment further discloses a power supply method applicable to the branching device.

The function and the procedure of the power supply unit 120 and the first and second switches 117 and 118 described according to example embodiments may be achieved by executing a program by a central processing device included in the branching device 100 or 200. The program is recorded in a fixed, non-transitory recording medium. As the recording medium, a general semiconductor memory is usable without limitation thereto. The central processing device is a computer and is also referred to as a central processing unit (CPU).

The present disclosure enables an optical submarine cable system to supply power to a branch line without installation of PFE in a branch station.

Moreover, the configuration described according to each example embodiment is not necessarily exclusive. Advantageous effects according to the present disclosure may be achieved by a configuration made by combining the whole or part of the above-described example embodiments.

The whole or part of the example embodiments disclosed above can be described as, but not limited to, the following supplementary notes.

(Supplementary Note 1)

A branching device to be used for branching a power supply path connecting a first trunk station and a second trunk station to a branch station, the branching device including:
- a first power reception port being connected with a first power supply path connected to the first trunk station;
- a second power reception port being connected with a second power supply path connected to the second trunk station;
- a third power reception port being connected with a third power supply path connected to the branch station; and
- a power supply unit configured to supply, via the third power reception port, power to the third power supply path by power supply from at least either of the first power supply path and the second power supply path.

(Supplementary Note 2)

The branching device according to supplementary note 1, wherein the power supply unit includes a DC/DC converter configured to convert power supplied from at least either of the first power supply path and the second power supply path into power to be supplied to the third power supply path.

(Supplementary Note 3)

The branching device according to supplementary note 1 or 2, wherein the power supply unit controls, based on a start signal received from an outside of the branching device, power supply to the third power supply path.

(Supplementary Note 4)

The branching device according to any one of supplementary notes 1 to 3, wherein the power supply unit controls, according to connection between the third power supply path and the third power reception port, power supply to the third power supply path.

(Supplementary Note 5)

The branching device according to any one of supplementary notes 1 to 4, further including a switch configured to switch, to a sea earth, when a failure occurs in the first power supply path, a connection destination of a terminal of the power supply unit connected to the first power reception port.

(Supplementary Note 6)

An optical submarine cable system including:
- the branching device according to any one of supplementary notes 1 to 5;
- the first trunk station connectable to the branching device via the first power supply path;
- the second trunk station connectable to the branching device via the second power supply path; and
- the branch station connectable to the branching device via the third power supply path.

(Supplementary Note 7)

The optical submarine cable system according to supplementary note 6, wherein
the power supply unit supplies power to the third power supply path according to
- a fact that the first trunk station or the second trunk station is connected to the branching device, and
- a fact that the third power reception port and the branch station are connected.

(Supplementary Note 8)

The optical submarine cable system according to supplementary note 6 or 7, wherein the branch station does not include a power supply function for the third power supply path.

(Supplementary Note 9)

A power supply method to be applied to a branching device to be used for branching a power supply path connecting a first trunk station and a second trunk station to a branch station, the method including:
- receiving supply of power from at least either of a first power supply path being connected to the first trunk station and a second power supply path being connected to the second trunk station; and
- supplying, to a third power supply path being connected to the branch station, the power supplied from the at least either of the first power supply path and the second power supply path.

(Supplementary Note 10)

The power supply method according to supplementary note 9, further including converting, by a DC/DC converter, the power supplied from at least either of the first power supply path and the second power supply path into power supplied to the third power supply path.

(Supplementary Note 11)

The power supply method according to supplementary note 9 or 10, further including controlling, based on a start signal, power supply to the third power supply path.

(Supplementary Note 12)

The power supply method according to any one of supplementary notes 9 to 11, further including controlling, according to connection between the third power supply path and the branching device, power supply to the third power supply path.

REFERENCE SIGNS LIST

1, 1A, 9, 9A Optical submarine cable system
100, 100A, 200 Branching device
101, 102 Trunk station
103, 103A Branch station
111 to 113 Power reception port
114 to 116 Power supply path
117 First switch
118 Second switch 120 Power supply unit
121 to 123, 121A, 123A Repeater
131, 131A Trunk line
141, 141A Branch line
400 I/V conversion circuit
401 Constant-voltage diode
500 DC/DC converter
501 Switching circuit
502 Isolation transformer
503 Rectification circuit
900 Branching device
901, 902 Trunk station
903, 904 Branch station
921 to 925 Repeater
931 to 934 PFE
941, 942 Branch line

The invention claimed is:

1. A branching device for branching a power supply path connecting a first trunk station and a second trunk station to a branch station, the branching device comprising:
    a first power reception port connected with a first power supply path connected to the first trunk station;
    a second power reception port connected with a second power supply path connected to the second trunk station;
    a third power reception port connected with a third power supply path connected to the branch station; and
    a power supply unit configured to supply, via the third power reception port, power to the third power supply path by power supply from at least either of the first power supply path and the second power supply path.

2. The branching device according to claim 1, wherein the power supply unit includes a DC/DC converter configured to convert power supplied from at least either of the first power supply path and the second power supply path, into power to be supplied to the third power supply path.

3. The branching device according to claim 1, wherein the power supply unit controls, based on a start signal received from an outside of the branching device, power supply to the third power supply path.

4. The branching device according to claim 1, wherein the power supply unit controls, according to connection between the third power supply path and the third power reception port, power supply to the third power supply path.

5. The branching device according to claim 1, further comprising a switch configured to switch, to a sea earth, when a failure occurs in the first power supply path, a connection destination of a terminal of the power supply unit connected to the first power reception port.

6. An optical submarine cable system comprising:
    a branching device;
    a first trunk station;
    a second trunk station; and
    a branch station,
wherein
    the branching device is for branching a power supply path connecting the first trunk station and the second trunk station to the branch station,
    the branching device includes:
        a first power reception port connected with a first power supply path connected to the first trunk station;
        a second power reception port connected with a second power supply path connected to the second trunk station;
        a third power reception port being connected with a third power supply path connected to the branch station; and
        a power supply unit configured to supply, via the third power reception port, power to the third power supply path by power supply from at least either of the first power supply path and the second power supply path,
    the first trunk station is connectable to the branching device via the first power supply path,
    the second trunk station is connectable to the branching device via the second power supply path, and
    the branch station is connectable to the branching device via the third power supply path.

7. The optical submarine cable system according to claim 6, wherein
    the power supply unit supplies power to the third power supply path according to
        a fact that the first trunk station or the second trunk station is connected to the branching device, and
        a fact that the third power reception port and the branch station are connected.

8. The optical submarine cable system according to claim 6, wherein the branch station does not include a power supply function for the third power supply path.

9. A power supply method applied to a branching device used for branching a power supply path connecting a first trunk station and a second trunk station to a branch station, the method comprising:
    receiving supply of power from at least either of a first power supply path connected to the first trunk station and a second power supply path connected to the second trunk station; and
    supplying, to a third power supply path connected to the branch station, the power supplied from the at least either of the first power supply path and the second power supply path.

10. The power supply method according to claim 9, further comprising converting, by a DC/DC converter, the power supplied from at least either of the first power supply path and the second power supply path, into power supplied to the third power supply path.

11. The power supply method according to claim 9, further comprising controlling, based on a start signal, power supply to the third power supply path.

12. The power supply method according to claim 9, further comprising controlling, according to connection between the third power supply path and the branching device, power supply to the third power supply path.

* * * * *